United States Patent
Disch et al.

(10) Patent No.: US 11,939,903 B2
(45) Date of Patent: Mar. 26, 2024

(54) METHOD FOR OPERATING AN EXHAUST BURNER, APPARATUS FOR PERFORMING SUCH A METHOD, AND MOTOR VEHICLE

(71) Applicant: Robert Bosch GmbH, Stuttgart (DE)

(72) Inventors: Christian Disch, Wimsheim (DE); Patrick Hoff, Tamm (DE); Torsten Kunz, Waldbronn (DE); William Krein, Neckarzimmern (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/303,450

(22) Filed: Apr. 19, 2023

(65) Prior Publication Data
US 2024/0003278 A1    Jan. 4, 2024

(30) Foreign Application Priority Data
Jul. 4, 2022   (DE) ..................... 10 2022 206 800.9

(51) Int. Cl.
*F01N 3/20*   (2006.01)
(52) U.S. Cl.
CPC ........ *F01N 3/2033* (2013.01); *F01N 2240/14* (2013.01); *F01N 2610/03* (2013.01)
(58) Field of Classification Search
CPC . F01N 3/2033; F01N 2240/24; F01N 2610/03
See application file for complete search history.

(56) References Cited

U.S. PATENT DOCUMENTS

2014/0311458 A1* 10/2014 Tsumagari ................ F01N 3/18
123/478

FOREIGN PATENT DOCUMENTS

| DE | 4132814 A1 | 4/1993 |
|---|---|---|
| DE | 19504208 A1 | 8/1995 |
| JP | 2004108344 A * | 4/2004 |

* cited by examiner

*Primary Examiner* — Audrey B. Walter
(74) *Attorney, Agent, or Firm* — NORTON ROSE FULBRIGHT US LLP; Gerard A. Messina

(57) ABSTRACT

A method for operating an exhaust burner with a secondary air system downstream of a combustion engine of a motor vehicle. The method includes: activating an ignition device as a function of a release condition, the ignition device being heated up to a specifiable target temperature; metering fuel at a first time point into a combustion chamber of the exhaust burner at a first injection frequency using an injection valve, and the combustion chamber not being actively supplied with air; setting a first target air-mass flow using a secondary air system at a further, second time point, wherein the air-mass flow is increased strictly monotonically; controlling the air-fuel ratio to a first target air-fuel ratio as a function of a lambda sensor starting from the second time point, and metering fuel at a second injection frequency; setting a second target air-mass flow at a further, third time point.

20 Claims, 8 Drawing Sheets

METHOD FOR OPERATING AN EXHAUST BURNER, APPARATUS FOR PERFORMING SUCH A METHOD, AND MOTOR VEHICLE

CROSS REFERENCE

The present application claims the benefit under 35 U.S.C. § 119 of German Patent Application No. DE 10 2022 206 800.9 filed on Jul. 4, 2022, which is expressly incorporated herein by reference in its entirety.

FIELD

The present invention relates to a method for operating an exhaust burner. The present invention also relates to an apparatus for performing such a method and to a motor vehicle.

BACKGROUND INFORMATION

In order to achieve legally prescribed emission limits, three-way catalysts (TWCs) that enable a conversion of the relevant gaseous pollutants NOx, HC, and CO into harmless products, such as N2, H2O, and CO2, can be used. In order for these catalytic reactions to proceed as intended, the temperatures in the catalyst generally must exceed the so-called light-off temperature of typically 300-400° C. As soon as this temperature is reached or exceeded, the catalyst converts the relevant pollutants almost completely (so-called catalyst window).

In order to achieve this state as quickly as possible, so-called internal engine catalyst heating measures can be applied. In so doing, the efficiency of the gasoline engine is lowered as a result of late ignition angles, and the exhaust temperature and enthalpy input into the catalyst are thus increased. With adapted injection strategies (e.g., multiple injections), combustion stability can simultaneously be ensured.

In addition to these internal engine catalyst heating measures, external catalyst heating measures can also be used, for example by means of electrically heatable catalysts or exhaust burners. Such external heating measures are described, for example, in German Patent No. DE 41 32 814 A1 and German Patent Application No. DE 195 04 208 A1. In order to further reduce emissions in comparison to conventional operation with internal engine heating measures, in particular during cold departures, i.e., high loads on the combustion engine in the cold state without an idling phase, so-called catalyst burners have proven to be an extremely effective measure for accelerating the TWC light-off.

SUMMARY

In a first aspect, the present invention relates to a method for operating an exhaust burner with a secondary air system, which exhaust burner is arranged in an exhaust system downstream of a combustion engine, in particular a diesel engine, of a motor vehicle. According to an example embodiment of the present invention, the method includes the following steps:
 activating an ignition device, in particular a glow plug, as a function of a release condition, wherein the ignition device is heated up to a specifiable target temperature,
 metering fuel at a first time point, in particular diesel fuel, into a combustion chamber of the exhaust burner at a specifiable first injection frequency by means of an injection valve, and wherein the combustion chamber is not actively supplied with air,
 setting a first target air-mass flow by means of a secondary air system at a further, second time point, wherein the air-mass flow is increased, in particular strictly monotonically,
 controlling the air-fuel ratio to a first target air-fuel ratio as a function of a lambda sensor starting from the second time point, and metering fuel at a second specifiable injection frequency,
 setting a second target air-mass flow at a further, third time point.

The present invention has the particular advantage that the injection of diesel fuel into the combustion chamber starts even before the combustion chamber is actively supplied with air, e.g., by a secondary air pump. This has the particular advantage that the diesel fuel pre-evaporates at the surface of the ceramic glow plug used and also directly ignites there during a corresponding dwell time. An advantage is in particular associated with fuels that are hard to ignite, such as diesel, and that, due to their boiling curve, only evaporate at high temperatures (in comparison to gasoline). Moreover, diesel fuel also has a comparatively significantly higher viscosity, which also reduces secondary jet disintegration during injection and thus leads to poorer spray preparation.

By means of the thus presented method for operating the exhaust burner, light-off temperatures of the catalysts can be achieved more quickly and emissions can thus be reduced early. The method is furthermore characterized in that the exhaust burner is operated with low emissions but simultaneously provides optimal heat generation.

The method enables a quick start with simultaneously minimal emissions by a (time or event-based) specification/procedure of air supply and air metering, fuel supply and fuel metering, injection frequency change and injection pressure adaptation.

In a further configuration, the first time point may correspond to a time point at which the ignition device reaches the specified target temperature.

Furthermore, between 200 ms and 700 ms may pass between the first time point and the second time point.

This has the advantage that the number of pre-injections is kept as low as possible so that only minor HC raw emissions (HC emissions) are produced. Generally, the pre-injection time as a function of the injection frequency is less than 700 ms. In practice, it may also be only 200 ms.

This achieves the goal of an absolutely fastest possible start, which thus causes lowest emissions and highest heat output.

In an alternative configuration, between 200 ms and 1000 ms may pass between the second time point and the third time point.

Moreover, the target temperature of the ignition device (110), in particular of the glow plug, may be at least 1000° C., in particular between 1000 and 1400° C.

For reliable ignition conditions, it is advantageous to have high temperatures on the glow plug (ceramic glow plug with T>1200° C.) so that at the start of injection, the diesel fuel can be evaporated and, where appropriate, directly ignited. It is particularly advantageous if the glow plug has already reached its maximum temperature at the time point t_fuel=t1 and thus enables both evaporation and ignition.

In an alternative configuration of the present invention, the fuel may be a diesel fuel, which is supplied to the exhaust burner for the first time after heating the glow plug as an ignition device at a first time point, in particular a start injection time point.

Furthermore, the fuel can be supplied to the exhaust burner at a first time point that is between the first time point and a second time point.

In a particular configuration of the present invention, the fuel can be injected into the combustion chamber of the exhaust burner by means of an injection valve at an injection frequency, and the fuel can be injected at a first injection frequency at the first time point and at a second injection frequency at the second time point.

Furthermore, the injection frequency may be kept constant in a first time period from the first time point to the second time point.

Moreover, the injection frequency may be continuously increased in a second time period from the first time point to the second time point.

The particular advantage lies in the independence from the gradient of the air-mass flow and the independence of the target mass flow. In this way, a fastest possible ramp-up of the load can be produced with the existing burner setup and correspondingly quick heat release can thus also be realized. Heat is thus directly discharged from the burner with the air supply.

Alternatively, the injection frequency may be decreased from the first time point to the second time point.

In a further configuration of the present invention, an air-fuel ratio may be increased from the second time point to the third time point by means of a step or continuously so that a higher second air-fuel ratio is achieved at the third time point starting from a first air-fuel ratio at the second time point.

Moreover, the second air-fuel ratio may be kept constant until a second time point, wherein a time period from the first time point to the further, second time point is shorter than a time period from the second time point to the third time point.

Furthermore, an amount of the fuel may be supplied to the combustion chamber in a time period from the first time point to the second time point, and the air-fuel ratio is initially hypostoichiometric and thereafter hyperstoichiometric.

Moreover, for varying the air-fuel ratio, an injection duration may be varied by means of an enrichment factor, wherein a further time period lies in a time period between the time periods with hypostoichiometric and hyperstoichiometric air-fuel ratios, in which further time period a stoichiometric air-fuel ratio is specified by omitting at least one injection process by setting the enrichment factor for this injection process to zero.

By means of the enrichment factor, the fuel fraction that, as a wall film, does not participate directly in the combustion can be compensated.

Such a pre-control is advantageous because a possible use for ascertaining the air-fuel ratio by a lambda probe may not yet be given due to the lead time for heating up the latter.

In a further configuration of the present invention, the air-mass flow may be kept constant from the second time point to a third time point, wherein a time period from the first time point to the second time point is shorter than a time period from the second time point to the third time point.

Furthermore, the method may be performed as a function of a request specified by the driver of the motor vehicle to start the combustion engine, wherein, as a function of a specification of the request, a lambda probe of the exhaust system is heated and/or the ignition device is heated, which is a glow plug.

In a particular configuration, the release condition is performed as a function of a request specified by the driver of the motor vehicle to start the combustion engine, wherein, as a function of a specification of the request, a lambda probe of the exhaust system is heated and/or the ignition device is heated, which is a glow plug.

The glow plug can in this case be energized once a vehicle intelligence has ascertained the request of the vehicle driver to start the journey. In this respect, energizing the glow plug can take place in a temporal relationship with or even at the same time as energizing or preheating the lambda probe.

In a further aspect, the present invention also relates to an apparatus for performing the method explained above. The apparatus comprises a gasoline engine and an exhaust system with an exhaust burner. The exhaust burner comprises a combustion chamber and a glow plug with which a fuel/air mixture can be ignited within the combustion chamber of the exhaust burner.

The present invention furthermore relates to a motor vehicle comprising such an apparatus.

Further features, possible applications and advantages of the present invention emerge from the description below of exemplary embodiments of the present invention, which are explained with reference to the figures.

DETAILED DESCRIPTION OF EXAMPLE EMBODIMENTS

Figure 1:
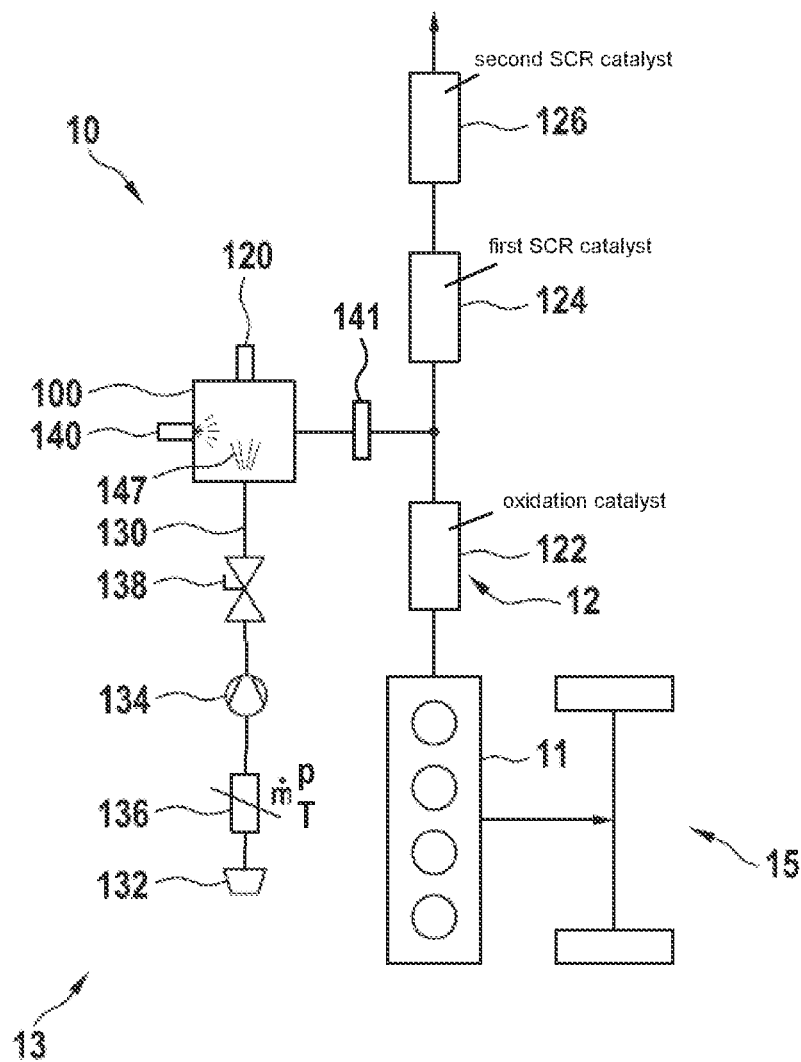
FIG. 1 schematically shows a motor vehicle with an exhaust burner.

A motor vehicle 10 is schematically shown in FIG. 1. The motor vehicle 10 comprises a powertrain 15 with a combustion engine 11, which is in particular designed as a diesel engine. However, it is also alternatively possible to design the combustion engine 11 as a gasoline engine. The motor vehicle furthermore comprises an exhaust system 12. The exhaust system 12 for the diesel engine as combustion engine 11 is primarily discussed below with reference to FIGS. 1 to 8.

An exemplary exhaust system 12 is configured for exhaust aftertreatment of exhaust gas produced by the combustion engine 11 and for this purpose comprises an oxidation catalyst 122, a first SCR catalyst 124 combined with a diesel particulate filter, and a second SCR catalyst 126 with optional clean-up catalyst. This arrangement of exhaust aftertreatment components is only exemplary.

In an advantageous configuration, an exhaust burner 100 is arranged downstream of the combustion engine 11 and upstream of the oxidation catalyst 122. The exhaust burner 100 is connected to the exhaust system 12 by means of its own pipe section such that the exhaust gas produced by the exhaust burner 100 and the resulting waste heat of the exhaust gas heats up the exhaust aftertreatment components arranged downstream.

A lambda sensor 141 is arranged within the pipe section from the exhaust burner 100 to the exhaust system 12, i.e., downstream of the exhaust gas.

This lambda sensor 141 is arranged in the pipe section such that only or almost exclusively exhaust gas of the exhaust burner 100 flows against it.

The air-fuel ratio of the exhaust burner 100 is controlled by means of the lambda sensor 141.

In an alternative configuration, the exhaust burner 100, with its associated piping system, may also be arranged downstream of the oxidation catalyst 122 and upstream of the first SCR catalyst 126. The selection of the position of the exhaust burner 100 is in particular variable along the exhaust track 12, provided that the exhaust burner 100 still produces waste heat to heat up an exhaust aftertreatment component.

In addition, the exhaust burner 100 is provided for heating at least a portion of the exhaust system 12, and an associated secondary air system 13 configured to actively supply air 147 to the exhaust burner 100 and to enable or facilitate oxidation reactions is provided. The secondary air system 13 includes an air filter 132, a secondary air pump 134, and an air-mass meter 136 that takes into account the pressure p and the temperature T. In addition, the secondary air system 13 includes a secondary air valve 138 that may be provided, for example, in the form of a check valve and that can prevent or allow an air supply 130 from the secondary air system 13 into the exhaust burner 100.

Figure 2:
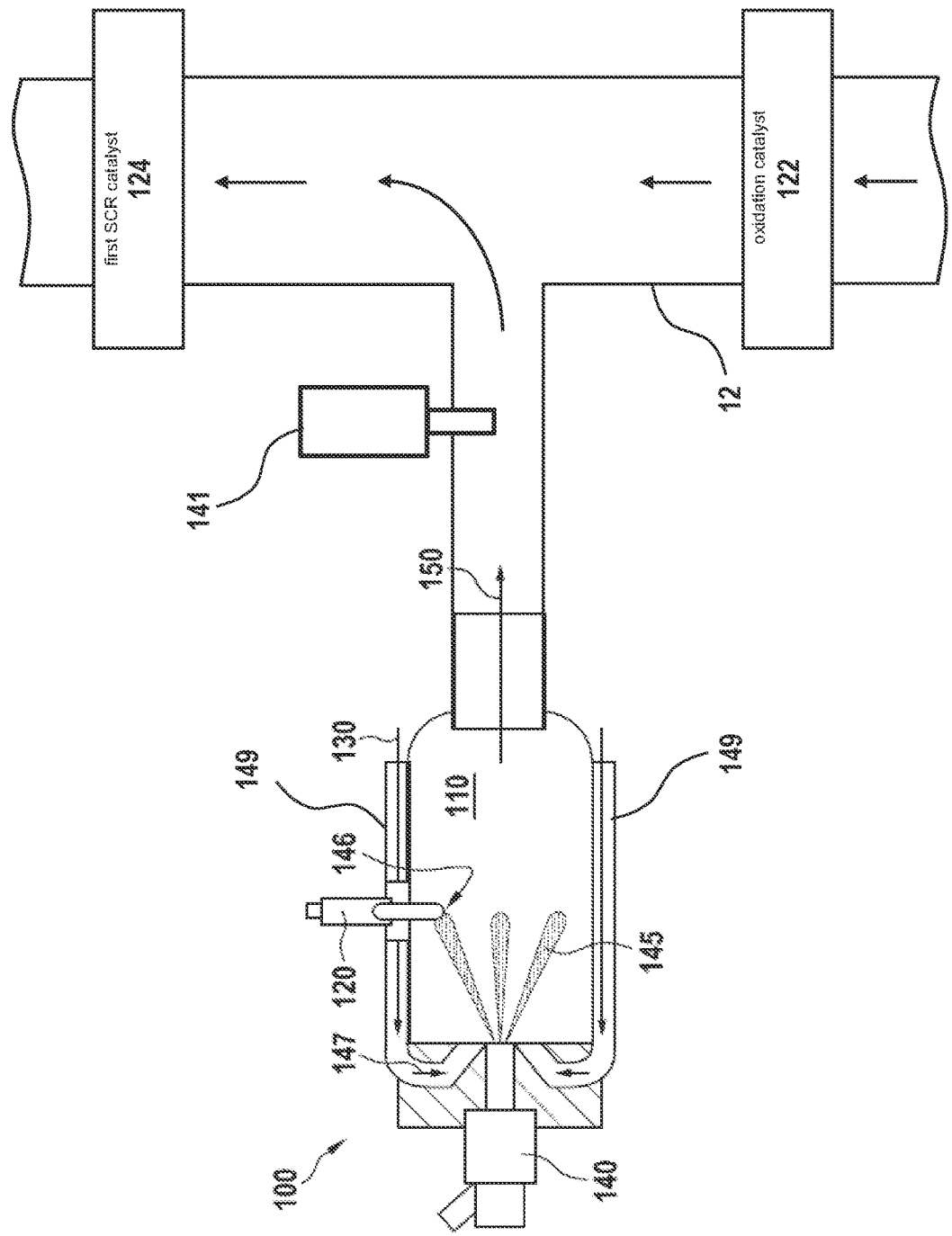
FIG. 2 schematically shows the exhaust burner of FIG. 1, which comprises a combustion chamber.

FIG. 2 schematically shows the structure of the exhaust burner 100. The exhaust burner 100 comprises a combustion chamber 110, an ignition device 120, the air supply 130, which is fed by the secondary air pump, and an injection valve 140. Moreover, the secondary air system comprises air supply lines 149, wherein swirl grilles (not shown further) are arranged in the air supply lines.

Fuel 145 introduced into the combustion chamber 110 is diesel fuel. During operation of the exhaust burner 100, the ignition device 120 is used to cause the diesel fuel along with the introduced air 147 to react, wherein hot exhaust gases 150 are produced, which are used to heat the components arranged downstream of the exhaust burner 100. A conduit that opens into the exhaust system 12 is arranged downstream of the exhaust burner 100. Downstream of the oxidation catalyst 122 and upstream of the first SCR catalyst 124, the lambda sensor 141 is arranged in the pipe section downstream of the exhaust burner 100.

This lambda sensor 141 is arranged in the pipe section such that only or almost exclusively exhaust gas of the exhaust burner 100 flows against it.

The air-fuel ratio of the exhaust burner 100 is controlled by means of the lambda sensor 141.

The diesel fuel is injected directly into the combustion chamber 110 by direct injection. In this respect, a feature of this design of the exhaust burner 100 is the direct injection of the fuel 145 into the combustion chamber 110 and the associated interaction with the ignition device 120. The ignition device 120 is preferably a glow plug so that a continuously hot surface and thus ignition capability is provided. However, in an alternative design, the ignition device 120 may also comprise a spark plug so that ignition takes place intermittently.

In particular, the glow plug is a ceramic glow plug that is preferably capable of producing peak temperatures between 1200-1400° C. and has short heating times of under three seconds to 1300° C.

Figure 3:
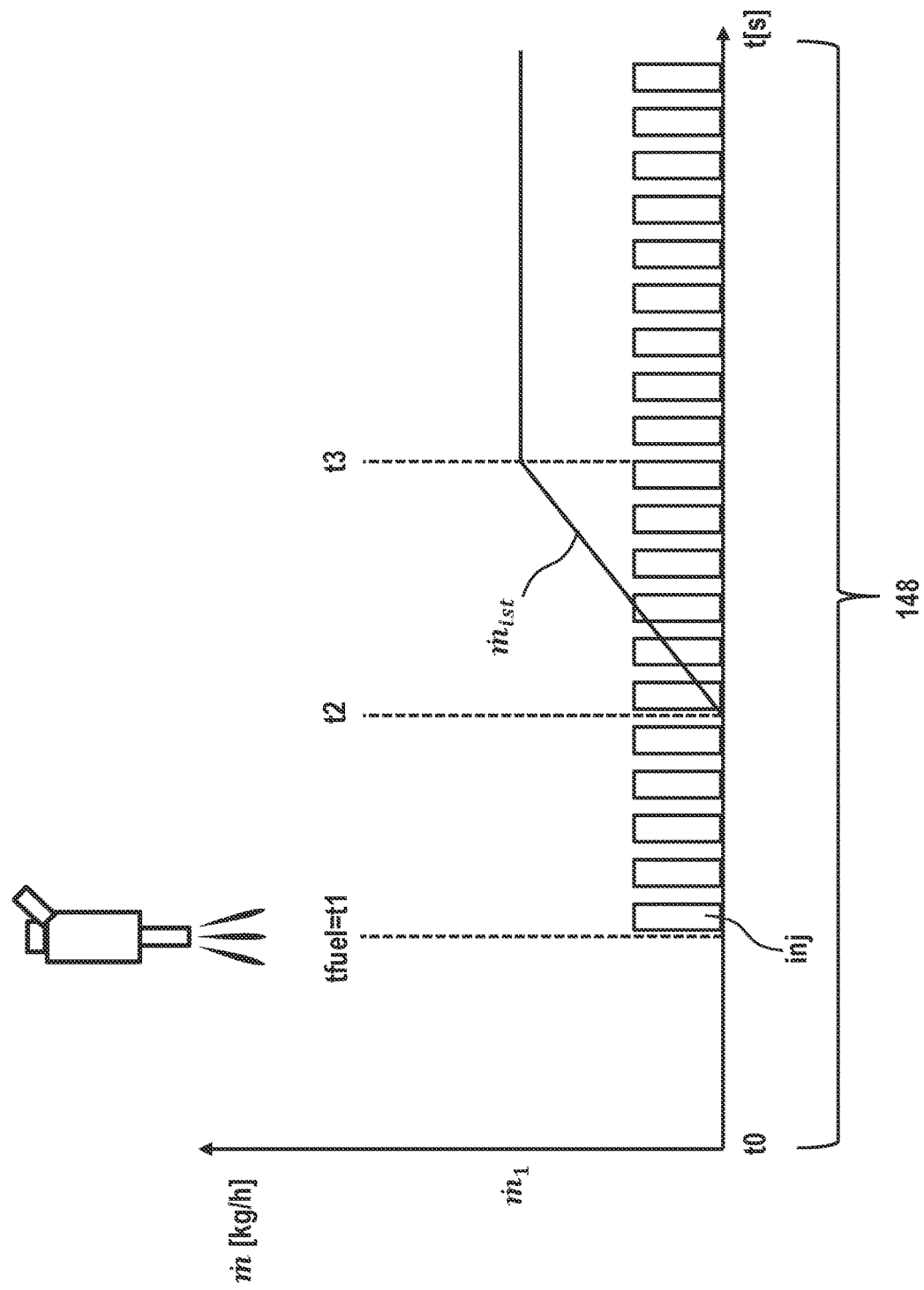
FIG. 3 is a schematic diagram showing a profile over time of an air-mass flow of air supplied to the combustion chamber of FIG. 2, wherein the associated engine is designed as a diesel engine.

FIG. 3 shows a time profile of an air supply and air metering. Thus, FIG. 3 shows, using a diagram, the profile of the air-mass flow ṁ of the air supplied to the combustion chamber 110 of FIG. 2 over a time t.

The air-mass flow ṁ is plotted in kg/h on the ordinate. Moreover, exemplary injections are denoted by reference sign inj. The time t is plotted in seconds on the abscissa. A sequentially performed method for starting the exhaust burner 100 is described below.

The method starts at a start time point to, at which a request of the vehicle driver to operate the diesel engine is already known.

At this start time point t0, a specifiable target temperature $T_{Soll}$ for the glow plug is set by the control unit 100 by means of an actual/target control. The specifiable target temperature $T_{Soll}$ corresponds in particular to a temperature between 1000° C. and 1400° C., particularly preferably approximately 1200° C. The actual temperature of the glow plug 120 is ascertained and monitored continuously, in particular by a measurement of the internal resistance of the glow plug by the control unit 100.

If the actual temperature of the glow plug 120 exceeds a specifiable first threshold value $S_1$, in particular of 1000° C., a first time point t1 or an injection time point t_fuel is reached and diesel fuel is injected into the combustion chamber 110 of the exhaust burner 100 by means of the injection valve 140 at a specifiable first injection frequency f1.

The combustion chamber 110 continues to not be actively supplied with air 147, e.g., by the secondary air system 13.

Although, at this time point, the fuel or the fuel/air mixture that has locally formed at the glow plug may ignite, the flame is quenched again in hyperstoichiometric areas in the combustion chamber 110 so that a temporally continuous flame may not occur. Without active air supply into the combustion chamber 110, a local combustion is thus already initiated in the area of the glow plug, but no stationary flame is formed in the combustion chamber 110.

At a next second time point t2, air is subsequently actively supplied into the combustion chamber 110 by the secondary air system 13.

Only with the start of the air supply that provides for a swirl or turbulence of the fuel injected by the injection valve 140 does a permanent flame form in the exhaust burner 100.

By means of the control unit 100, a specifiable first target air-mass flow $\dot{m}_1$ is set and a target/actual control assumes control of the secondary air pump 134. The actual air-mass flow $\dot{m}_{ist}$ is preferably ascertained continuously via the air-mass meter 136 by the control unit 100.

The increase in air-mass flow ṁ is defined by a gradient from the start time point t1 to the reaching of the first air-mass flow $\dot{m}_1$ at the third time point t3. This gradient is system-dependent and may in particular depend on
- an output of the secondary air pump 134, and/or
- one or more conduit lengths, and/or
- one or more conduit cross sections, and/or one or more additional flow resistances, and/or a temperature, in particular an outside temperature and/or the temperature of the exhaust burner, and/or a moisture of the air and/or of the diesel, and/or an altitude or an air pressure.

Starting at the second time point t2, the actual air-mass flow $\dot{m}_{Ist}$ is increased to the first target air-mass flow $\dot{m}_1$. The increase of the actual air-mass flow mist to the first target air-mass flow $\dot{m}_1$ can preferably be increasing or monotonically increasing or linear. Moreover, with the start of the second time point t2, a changed injection frequency f2 may also be set by the control unit 100.

The increase of the actual air-mass flow $\dot{m}_{Ist}$ to the first target air-mass flow $\dot{m}_1$ preferably takes place starting from the second time point t2 and ending at the third time point t3. The particular advantage lies in the independence from the gradient of the air-mass flow and the independence of the first target air-mass flow $\dot{m}_1$. Thus, a fastest possible ramp-up of the load for the exhaust burner 100 can be produced and rapid heat release can be realized.

Additionally, from the second time point t2, a known air-fuel control is activated. By means of the lambda sensor 141, the actual air-fuel ratio $\lambda_{Ist}$ is ascertained starting from the second time point t2 and the lambda control is performed in a conventional manner by changing the fuel injection, in particular by changing the injection frequency f_inj for the injection valve 140.

In an alternative configuration, if the lambda sensor 141 cannot yet provide a signal for the actual air-fuel ratio $\lambda_{Ist}$ due to a component protection function, the air-fuel ratio can be controlled by means of a characteristic map stored in the control unit 100.

In an advantageous configuration, the specified target air-mass flow $\dot{m}_1$ remains identical at the third time point t3. In an alternative configuration, a further, second target air-mass flow $\dot{m}_2$ may be set at the third time point t3.

The time that passes between the first time point t1 to the second time point t2 is in particular less than 200-700 ms.

The time that passes from the second time point t2 to the third time point t3, i.e., the time period required to reach the first target air-mass flow $\dot{m}_1$, is preferably between 200 and 1000 ms in length.

Here, a time period t2–t1 from the first time point t1 to the second time point t2 is shorter than a time period t3–t2 from the second time point t2 to the third time point t3.

From FIG. 4, it can be seen that the injection frequency f_inj is set to a first injection frequency f1 no later than at the start injection time point t_fuel or first time point t1. Thereafter, the injection frequency f_inj is changed to a second injection frequency f2 at the subsequent second time point t2.

This change in the injection frequency f_inj may take place both in multiple steps and continuously. For illustrative purposes, the diagram of FIG. 4 shows, on the one hand, a dashed line which represents an increase of the injection frequency f_inj in two steps. In addition, an alternative adaptation of the injection frequency f_inj is represented using a curve, which is likewise dashed. The curve represents a continuous increase in the injection frequency f_inj from the first injection frequency f1 to the second injection frequency f2.

Figure 4:
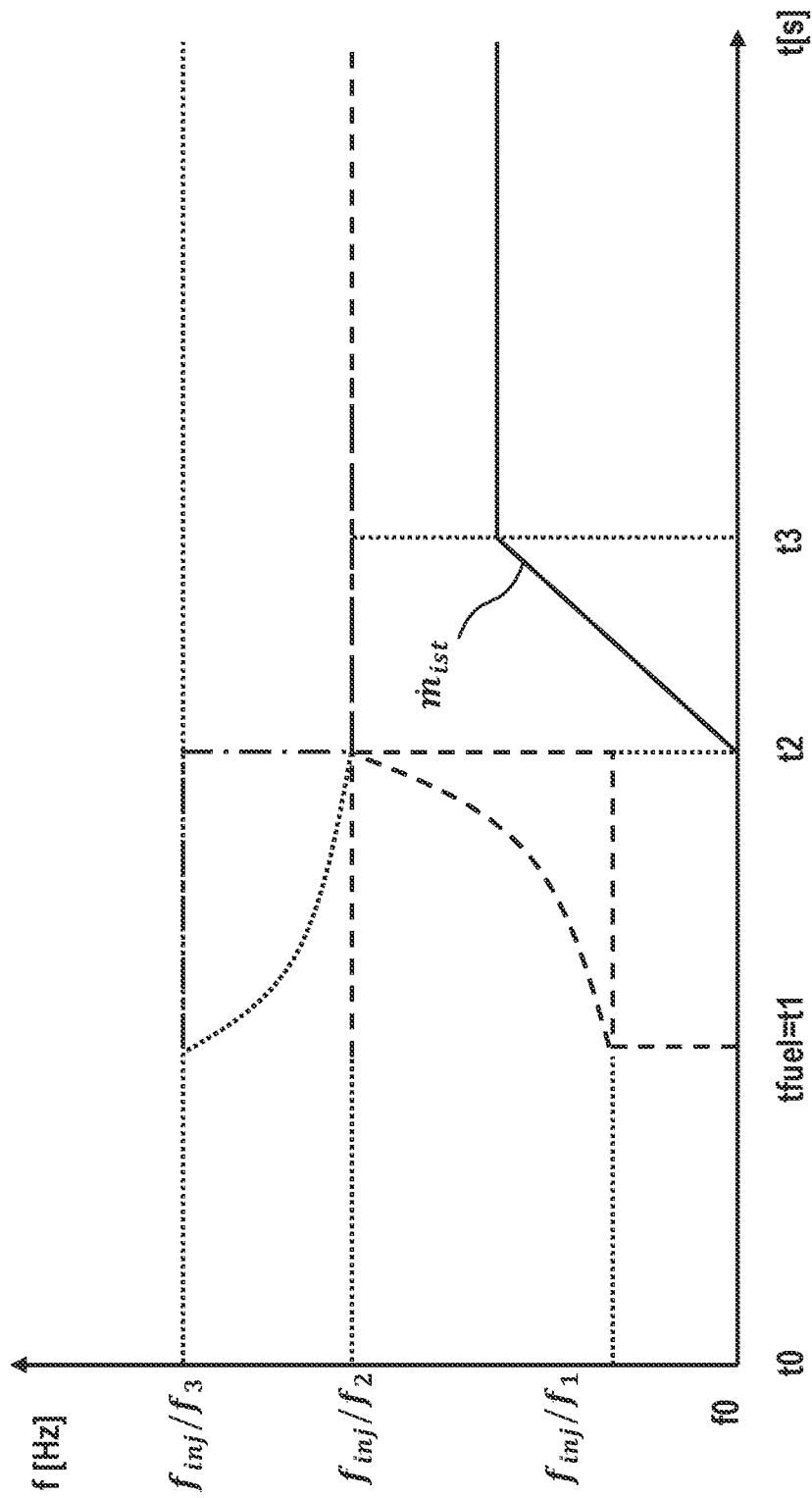
FIG. 4 is a schematic diagram according to the diagram of FIG. 3, wherein an injection frequency is additionally shown, wherein a temporal injection frequency change under the premise of intermittent use is shown.

In both alternative embodiments of FIG. 4, it is provided that at startup during pump ramp-up, i.e., between the second time point t2 and the third time point t3, the first injection frequency f1 is different than the second injection frequency f2 at which the exhaust burner operates in stationary operation at a time point t>t3.

In a further, simplified exemplary embodiment, the first injection frequency f1 may be kept constant from the start injection time point t_fuel to the second time point t3 so that no change of the injection frequency f_inj is necessary.

Two further alternative embodiments also emerge from FIG. 4. In these alternative embodiments, it is provided that the injection frequency f, starting from a start injection time point tfuel=t1 at a first injection frequency, which is subsequently denoted by f3 for differentiation, is decreased continuously or in steps to the second injection frequency f2 until the first time point t2.

Figure 5:
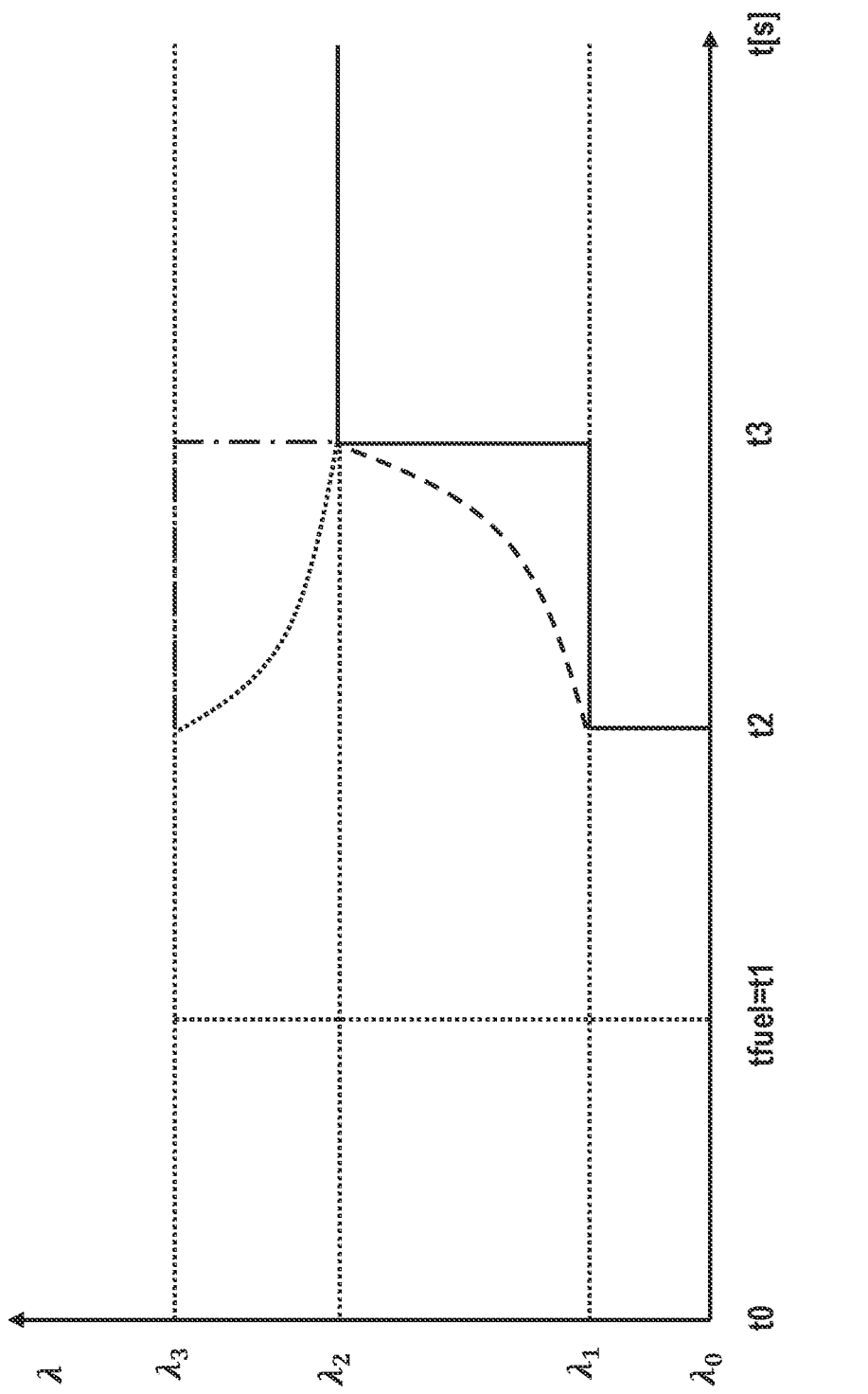
FIG. 5 is a schematic diagram of an air-fuel ratio A over time.

In FIG. 5, using a diagram, a specification of the air-fuel ratio A is plotted over the time t. The scaling of the time t on the abscissa is adapted to the abscissa of FIGS. 3 and 4 so that the time points t0, t_fuel, t1, t2, t3 correspond to the identically denoted time points t0, t_fuel, t1, t2, t3 of FIGS. 3 and 4. The specification of the air-fuel ratio $\lambda$ is adapted to a first air-fuel ratio $\lambda 1$ at the latest at the second time point t2. An initial air-fuel ratio value $\lambda 0$ is not relevant because the injection process is released at the earliest at the start injection time point t_fuel at the injection frequency f_inj=f1. In absolute terms, the first air-fuel ratio $\lambda 1$ may be hypostoichiometric, stoichiometric, or hyperstoichiometric. At the third time point t3, in addition to the second injection frequency f2, the specification for the air-fuel ratio $\lambda$ may also be adapted from the first air-fuel ratio $\lambda 1$ to a second air-fuel ratio $\lambda 2$. In this case, the second air-fuel ratio $\lambda 2$ is greater than the first air-fuel ratio $\lambda 1$, i.e., $\lambda 2 > \lambda 1$.

Alternatively, and if the air-fuel ratio $\lambda$ between the second time point t2 and the third time point t3 is hyperstoichiometric, the second air-fuel ratio $\lambda 2$ may be less than the third air-fuel ratio $\lambda 3$, i.e., $\lambda 2 < \lambda 3$. This makes it possible to achieve particularly good emissions values.

The air-fuel ratio $\lambda$ may be changed both in multiple steps and continuously. For illustrative purposes, the diagram of FIG. 5 shows, on the one hand, a solid line which represents an increase of the air-fuel ratio $\lambda$ in two steps. In addition, an alternative adaptation of the air-fuel ratio $\lambda$ is represented using a dashed curve. The curve represents a continuous increase in the air-fuel ratio $\lambda$ from the first air-fuel ratio $\lambda 1$ to the second air-fuel ratio $\lambda 2$. In an alternative embodiment, it may also be provided that the air-fuel ratio $\lambda$ is continuously decreased starting from the second time point t2 to the third time point t3.

Alternatively, it is possible that the air fuel ratio $\lambda$ at the second time point t2 may be kept constant at the third time point t3. In order to simplify the control effort, it may also be provided that the first air-fuel ratio $\lambda 1$ is kept constant from the second time point to the third time point t3 so that no change in the air-fuel ratio $\lambda$ is necessary.

Due to possible wall film formations, there is an application of fuel to the surface of the combustion chamber during the startup process of the exhaust burner. This wall film has the result that the specified air-fuel ratio $\lambda$ may not be achieved accurately in accordance with the specification (pre-control). The fraction of fuel that forms as the wall film thus participates in the combustion with a time delay. This results in a deviation from the specification of the air-fuel ratio $\lambda$. For this purpose, a number of x injections are provided with an enrichment factor A. For example, the first injected fuel masses are multiplied by an enrichment factor A=1.5, whereby the injected fuel mass is increased by 50%. In this way, the fraction of the fuel that, as a wall film, does not participate directly in the combustion can be compensated. This form of pre-control is also advantageous because the air-fuel ratio $\lambda$ cannot yet be ascertained because a lambda probe has not yet been heated up. This is because in order to determine the air-fuel ratio λ using a lambda probe, the latter needs a lead time in which the lambda probe is heated up. However, even if the lambda probe is heated up very early on, for example when pulling a door handle of the motor vehicle, this form of pre-control is still advantageous because the travel times of the exhaust gases from the exhaust burner to the lambda probe are still to be taken into account. Heating up the lambda probe may also be brought into a temporal relationship with heating up the glow plug of the exhaust burner.

In this respect, a request of the driver to start the combustion engine 10 may be ascertained. Immediately or at a different time after this request has become known, the lambda probe and/or the glow plug can already be energized and thus heated. This request of the driver may be provided
- by actuating the door handle, or
- by moving/drawing a seatbelt, or
- by pressing the "open" button on a remote control of the motor vehicle, in particular twice, or
- by a respective request specification by means of an app (software application) on a mobile phone or a wearable device, or
- by actuating the "engine start/stop" switch in the motor vehicle.
- The specification of the request by means of an app can in particular be the direct specification (e.g., symbol or text "exhaust burner on") to start the exhaust burner. In the context of the on-board diagnostics (OBD) by a control unit (controller) of the exhaust burner, this specification of the request can in particular be considered as a "wake-up" signal on the basis of which the lambda probe and/or the glow plug of the exhaust burner is heated up. In this respect, it is advantageous if the means for detecting the specification (i.e., the door handle, the seatbelt sensor, etc.) is integrated into the OBD.

Figure 6:
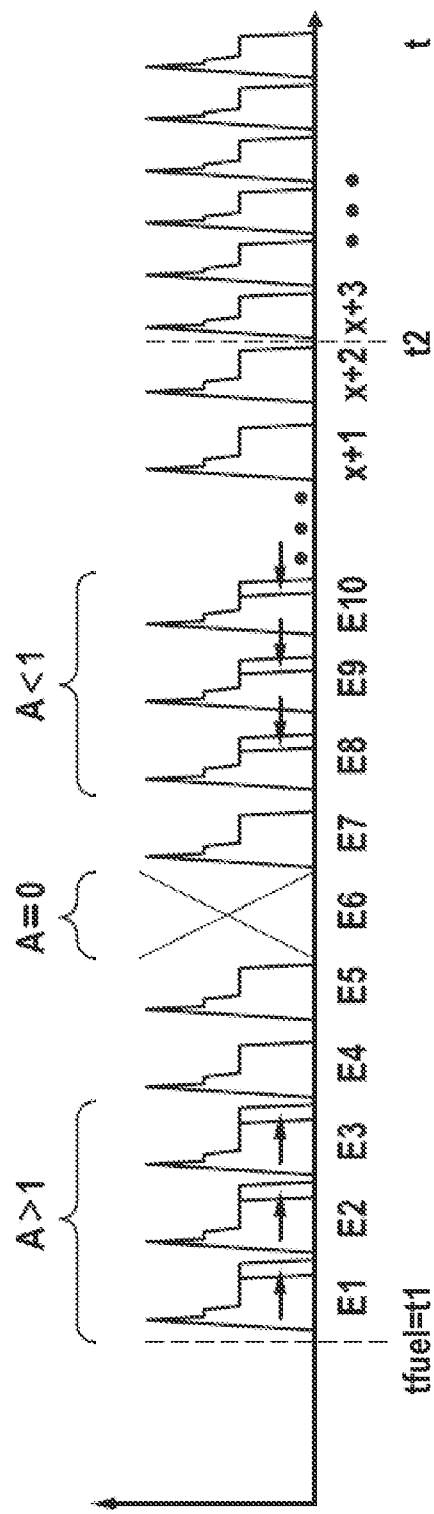
FIG. 6 schematically shows a time detail of FIG. 4, which represents an injection duration or enrichment factors for a start phase of the initially cold exhaust burner according to FIGS. 1 and 2.

FIG. 6 shows ten injection processes E1 to E10 and not immediately subsequent injection processes x+n. The first injection process E1 starts at the start injection time point t_fuel or at the first time point t1. The injection process x+3 starts at the second time point t2. FIG. 6 shows an enrichment factor A>1 by which, when the exhaust burner is cold, an increase in the injected fuel mass is achieved by extending the injection duration of the first three injection processes E1 to E3. During the reduction of the wall film, an enrichment factor A<1 is specified at a later time point of the start process in order to temporarily compensate for the resulting enrichment of the combustion. However, such an enrichment factor A<1 is not absolutely necessary.

In this respect, an amount of the fuel is supplied in a time period t2−t1 from the start injection time point t_fuel=t1 to the second time point t2. The air-fuel ratio λ is initially hypostoichiometric and thereafter hyperstoichiometric.

In a further alternative or additional measure, the fuel mass is multiplied by the enrichment factor A=0 during individual injection processes E6 so that no fuel mass is injected. As a result, the specification of the air-fuel ratio λ may be achieved more quickly and precisely. In the exemplary embodiment of FIG. 6, the sixth injection process E6 was omitted.

In this respect, in order to vary the air-fuel ratio λ, the injection duration is varied by means of the enrichment factor A. In a time period between the time periods of hypostoichiometric and hyperstoichiometric air-fuel ratios λ, there is a further time period in which a stoichiometric air-fuel ratio λ is specified by omitting at least one injection process E6 by setting the enrichment factor A for this injection process E6 to zero.

In addition to the described changes in air flow rate and air-mass flow, the frequencies for injection, the air-fuel ratio, the enrichment factors, adaptation of the injection pressure p is also possible. This adaptation of the injection pressure p is described below with reference to FIG. 7.

Figure 7:
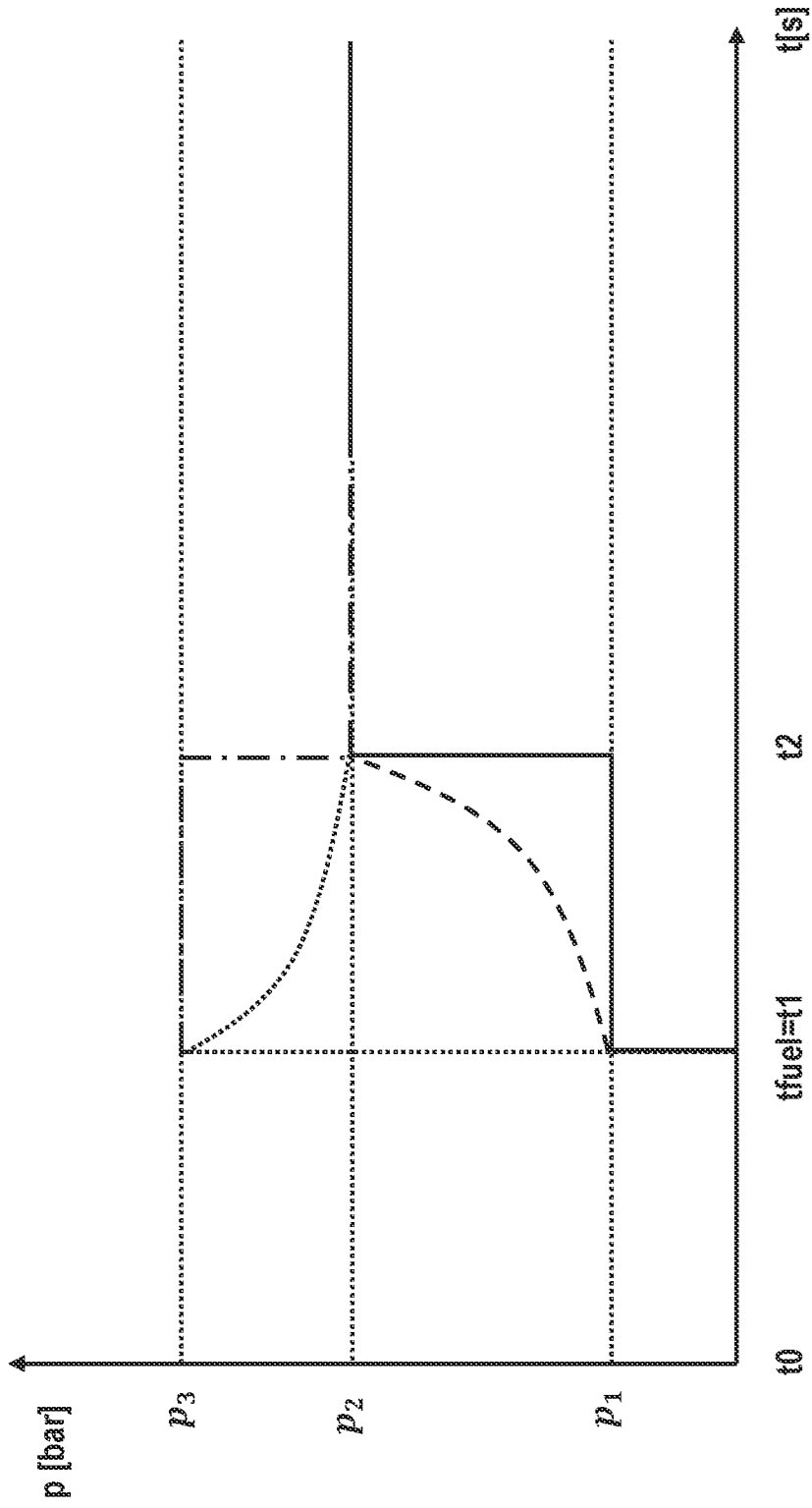
FIG. 7 shows a fuel injection pressure over time.

An initial injection pressure p0 is not relevant because the injection process is released at the earliest at the first time point tfuel=t1 at the injection frequency f_inj=f1. For this reason, a first injection pressure p1 is to be reached by no later than at the first time point t1. At the second time point t2, the second injection pressure p2 is changed in comparison to the first injection pressure p1. Both a pressure increase and a pressure decrease at the second time point t2 are possible. FIG. 7 shows a pressure increase from the first injection pressure p1 to the second injection pressure p2.

The injection pressure p may be changed both in multiple steps and continuously. For illustrative purposes, the diagram of FIG. 7 shows, on the one hand, a solid line which represents an increase of the injection pressure p in two steps. In addition, an alternative adaptation of the injection pressure p is represented using a dashed curve. The curve represents a continuous increase in the injection pressure p from the first injection pressure p1 to the second injection pressure p2.

Two further alternative embodiments also emerge from FIG. 7. In these alternative embodiments, it is provided that the injection pressure p, starting from a first time point tfuel=t1 at a first injection pressure, which is subsequently denoted by p3 for differentiation, is decreased continuously or in steps to the second injection pressure p2 until the second time point t2.

Figure 8:
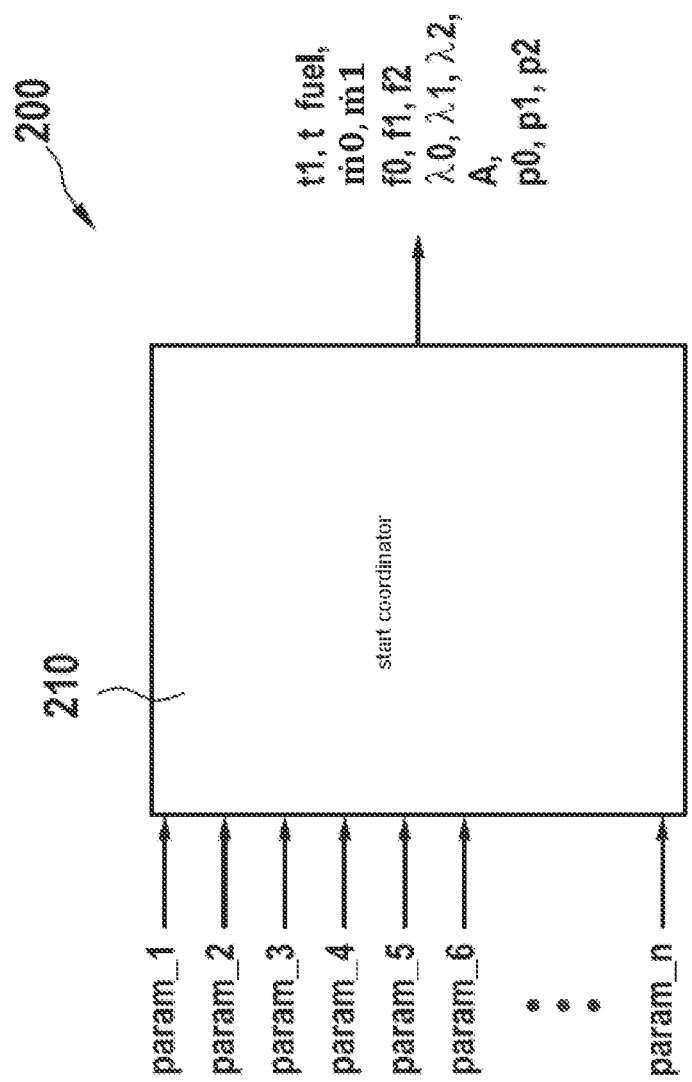
FIG. 8 shows an advantageous configuration of a method according to an example embodiment of the present invention in a simplified representation.

In FIG. 8, an advantageous configuration of the method is shown in a simplified manner in the form of a block diagram and denoted as a whole by 200. Output parameters of the method are formed from the first, second and third time points t1, t2, t3, the first and second mass flow $\dot{m}_0$, $\dot{m}_1$, the frequency, which may be at f0=0 Hz, the first and second injection frequencies f1, f2, the initial air-fuel ratio value λ0=0, the first and second air-fuel ratios λ1, λ2, the enrichment factor A, the initial injection pressure p0, and the first and second injection pressures p1, p2.

Various input parameters param_1 to param_n are taken into account for ascertaining the output parameters. These input parameters param_1 to param_n are evaluated in a start coordinator 210 of a control of the exhaust burner, and the output parameters t1, t2, t3, $\dot{m}_0$, $\dot{m}_1$, f0, f1, f2, λ0, λ1, λ2, A, p0, p1, p2 are calculated or adapted accordingly. For example, the input parameters param_1 to param_n are
- an outside temperature,
- a barometric altitude,
- a humidity,
- sensor data for evaluating the start, which represent, for example, a temperature T within the exhaust burner, the injection pressure p, and the air-fuel ratio λ,
- a history of previous starts or a start adaptation, and/or
- parameters from an engine control unit, such as a battery voltage, a current drive motor speed, a throttle position, a fuel injection pressure, a lambda requirement, and/or differential pressures of the exhaust system, for example at the diesel particulate filter (DPF),
- and a fuel specification.

What is claimed is:

1. A method for operating an exhaust burner with a secondary air system, the exhaust burner being arranged in an exhaust system downstream of a combustion engine of a motor vehicle, the combustion engine being a diesel engine, the method comprising the following steps:

activating an ignition device as a function of a release condition, wherein the ignition device is heated up to a specifiable target temperature, the ignition device being a glow plug;

metering fuel at a first time point into a combustion chamber of the exhaust burner at a specifiable first injection frequency using an injection valve, wherein the combustion chamber is not actively supplied with air, and wherein the fuel is diesel fuel;

setting a first target air-mass flow using the secondary air system at a further, second time point, wherein an air-mass flow is increased strictly monotonically;

controlling an air-fuel ratio to a first target air-fuel ratio as a function of a lambda sensor starting from the second time point, and metering fuel at a specifiable second injection frequency; and setting a second target air-mass flow at a further, third time point.

2. The method according to claim 1, wherein the first time point corresponds to a time point at which the ignition device reaches the specified target temperature.

3. The method according to claim 1, wherein between 200 ms and 700 ms pass between the first time point and the second time point.

4. The method according to claim 1, wherein between 200 ms and 1000 ms pass between the second time point and the third time point.

5. The method according to claim 1, wherein the target temperature of the ignition device is between 1000° C. and 1400° C.

6. The method according to claim 1, wherein the fuel is supplied to the exhaust burner for a first time after heating the glow plug as an ignition device at the first time point, the first time point being a start injection time point.

7. The method according to claim 1, wherein the fuel is supplied to the exhaust burner at a time point that is between the first time point and the second time point.

8. The method according to claim 1, wherein the fuel is injected into the combustion chamber of the exhaust burner using the injection valve at an injection frequency, and the fuel is injected at the first injection frequency at the first time point and at the second injection frequency at the second time point.

9. The method according to claim 8, wherein the injection frequency is kept constant in a time period from the first time point to the second time point.

10. The method according to claim 8, wherein the injection frequency is continuously increased in a time period from the first time point to the second time point.

11. The method according to claim 8, wherein the injection frequency is decreased from the first time point to the second time point.

12. The method according to claim 1, wherein an air-fuel ratio is increased from the second time point to the third time point by a step or continuously so that a higher second air-fuel ratio is achieved at the third time point starting from a first air-fuel ratio at the second time point.

13. The method according to claim 12, wherein the second air-fuel ratio is kept constant until the third time point, wherein a time period from the first time point to the second time point is shorter than a time period from the second time point to the third time point.

14. The method according to claim 12, wherein an amount of the fuel is supplied to the combustion chamber in a time period from the first time point to the second time point, and the air-fuel ratio is initially hypostoichiometric and thereafter hyperstoichiometric.

15. The method according to claim 14, wherein for varying the air-fuel ratio, an injection duration is varied using an enrichment factor, and a further time period lies in a time period between time periods with hypostoichiometric and hyperstoichiometric air-fuel ratios, in which further time period a stoichiometric air-fuel ratio is specified by omitting at least one injection process by setting the enrichment factor or the injection process to zero.

16. The method according to claim 1, wherein the air-mass flow is kept constant from the second time point to the third time point, wherein a time period from the first time point to the second time point is shorter than a time period from the second time point to the third time point.

17. The method according to claim 1, wherein the method is performed as a function of a request specified by a driver of the motor vehicle to start the combustion engine, wherein, as a function of a specification of the request, a lambda probe of the exhaust system is heated and/or the ignition device is heated.

18. The method according to claim 1, wherein the release condition is performed as a function of a request specified by a driver of the motor vehicle to start the combustion engine, wherein, as a function of a specification of the request, a lambda probe of the exhaust system is heated and/or the ignition device is heated.

19. An apparatus, comprising:

a combustion engine;

an exhaust system with an exhaust burner including a combustion chamber and a glow plug as an ignition device with which a fuel/air mixture within the combustion chamber of the exhaust burner can be ignited;

wherein the apparatus is configured to:

activate the ignition device as a function of a release condition, wherein the ignition device is heated up to a specifiable target temperature;

meter fuel at a first time point into the combustion chamber of the exhaust burner at a specifiable first injection frequency using an injection valve, wherein the combustion chamber is not actively supplied with air, and wherein the fuel is diesel fuel;

set a first target air-mass flow using a secondary air system at a further, second time point, wherein an air-mass flow is increased strictly monotonically;

control an air-fuel ratio to a first target air-fuel ratio as a function of a lambda sensor starting from the second time point, and metering fuel at a specifiable second injection frequency; and set a second target air-mass flow at a further, third time point.

20. A motor vehicle, comprising:

an apparatus, including:

a combustion engine;

an exhaust system with an exhaust burner including a combustion chamber and a glow plug as an ignition device with which a fuel/air mixture within the combustion chamber of the exhaust burner can be ignited;

wherein the apparatus is configured to:

activate the ignition device as a function of a release condition, wherein the ignition device is heated up to a specifiable target temperature;

meter fuel at a first time point into the combustion chamber of the exhaust burner at a specifiable first injection frequency using an injection valve, wherein the combustion chamber is not actively supplied with air, and wherein the fuel is diesel fuel;

set a first target air-mass flow using a secondary air system at a further, second time point, wherein an air-mass flow is increased strictly monotonically;

control an air-fuel ratio to a first target air-fuel ratio as a function of a lambda sensor starting from the second time point, and metering fuel at a specifiable second injection frequency; and set a second target air-mass flow at a further, third time point.

\* \* \* \* \*